S. WING.
Camera.
No. 30,850.
2 Sheets—Sheet 1.
Patented Dec. 4, 1860.
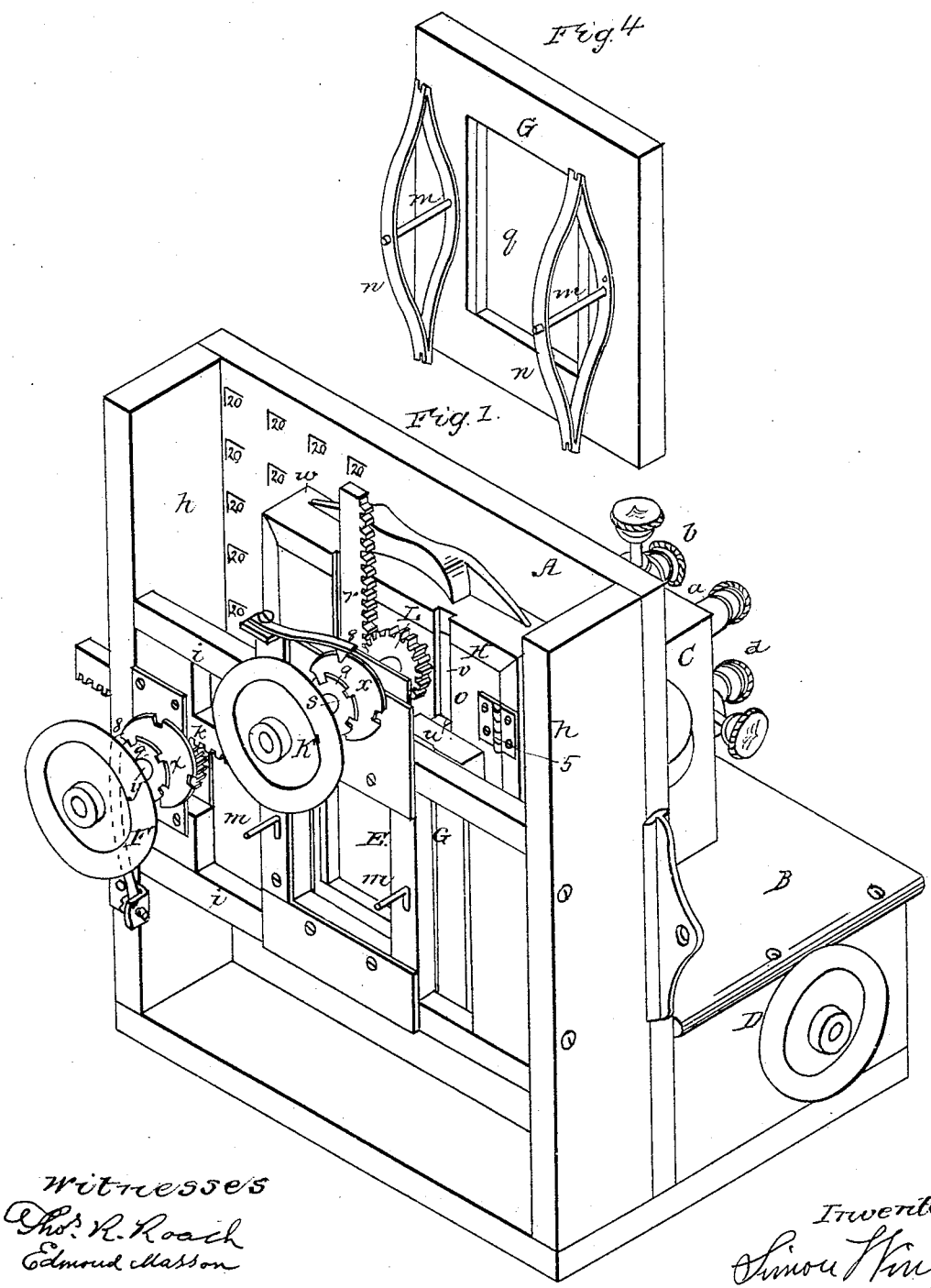
Witnesses
Thos. R. Roach
Edmond Masson
Inventor
Simon Wing

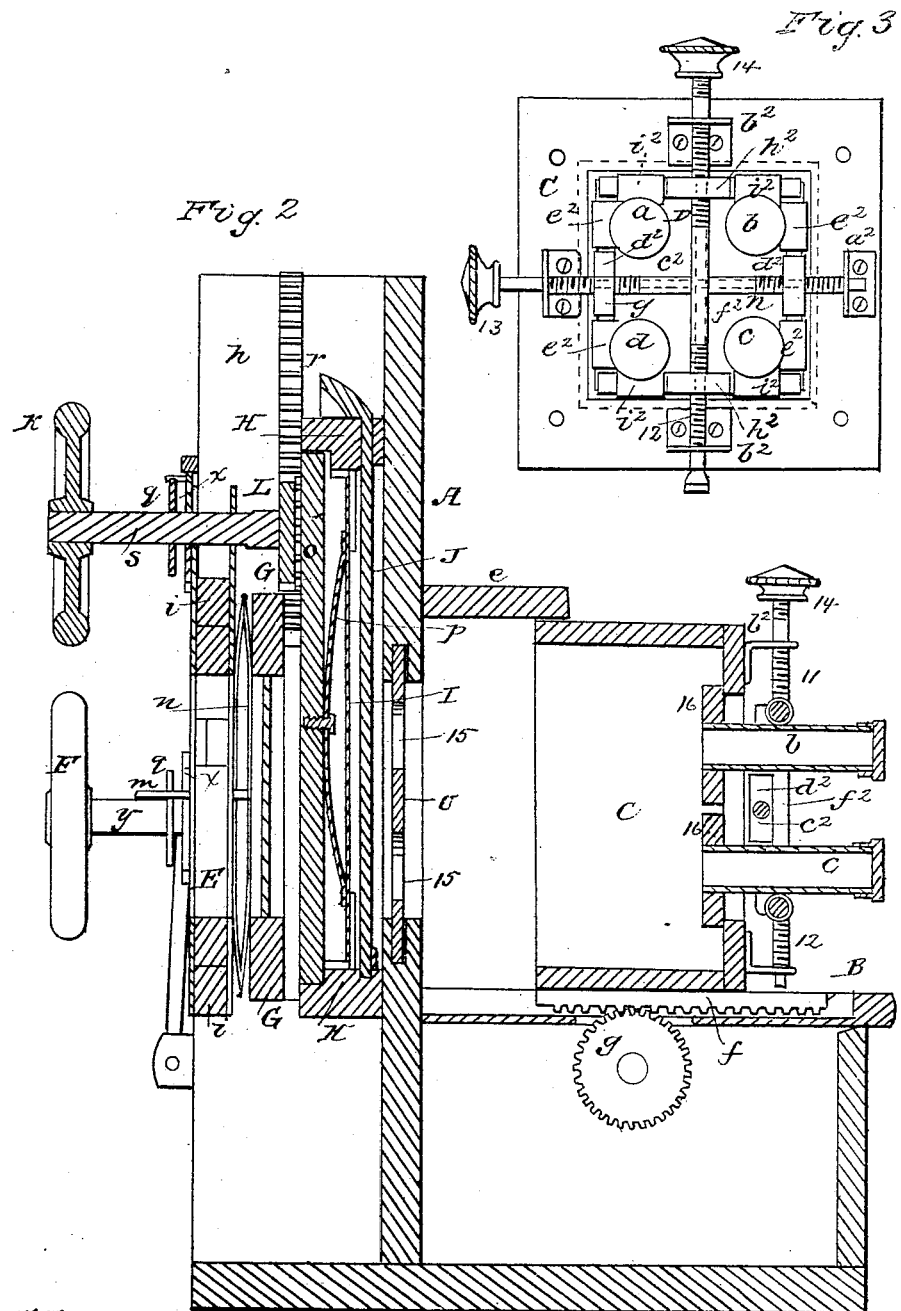

UNITED STATES PATENT OFFICE.

SIMON WING, OF WATERVILLE, MAINE.

IMPROVEMENT IN PHOTOGRAPHIC CAMERAS.

Specification forming part of Letters Patent No. 30,850, dated December 4, 1860.

*To all whom it may concern:*

Be it known that I, SIMON WING, of Waterville, in the county of Kennebec and State of Maine, have invented certain Improvements in Cameras for Taking Photographic Impressions, of which the following is a full, clear, and exact description, reference being had to the accompanying drawings, making part of this specification, in which—

Figure 1 is a perspective view from the rear side of a camera with my improvements attached. Fig. 2 is a longitudinal vertical section through the middle of the same; Fig. 3, a front view of the lens-box; Fig. 4, detail to be referred to hereinafter.

Letters Patent of the United States were granted on the 10th day of April, 1855, to A. S. Southworth, of Boston, Massachusetts, for an improved plate-holder for cameras, in which the plate-holder was permitted to move for the purpose of bringing different portions of the same plate successively into the field of the lens of the camera. The device shown by him for adjusting and defining the position of the plate-holder was sufficient where but a few impressions were to be taken on a single plate; but where a larger plate is to be used and a greater number of impressions are to be taken on it for the purpose of economizing time and labor and where different-sized plates are used and a varying number and size of impressions on the plates are taken it requires a greater scope of adjustment for the plate-holder and a more convenient and accurate method of moving and regulating the position of the plate-holder. To furnish these is the object of the first part of my present invention, which consists in a mechanical means of moving the plate-holder, in combination with a scale or index for defining its position with respect to the lens, to accord with the required number of impressions to be taken on the plate.

The second part of my invention consists in the application of convenient mechanism for simultaneously adjusting the several lens-tubes in position, where two or more of these tubes are used in the same camera, it being now customary to use more than one lens-tube where several impressions of the same object are to be taken.

That others skilled in the art may understand and use my invention, I will proceed to describe the manner in which I have carried out the same.

In the said drawings, A is the frame of the camera, from the front side of which projects a table B, on which slides the lens-box C. (Shown detached in Fig. 3.) This box C, which contains the lens-tubes $a\ b\ c\ d$, slides in a casing $e$, attached to the front of the frame A, and is moved in and out to change the foci of the lenses by means of a rack $f$ and pinion $g$, operated by a hand-wheel D. A side board $h$ extends back from each side of the frame A, and two rails $i$ extend across from one to the other of these side boards. On these rails slides a frame E, to one side of which is attached a rack-bar $k$. A pinion $l$ on a short shaft $y$, to which is attached the hand-wheel F, engages with this rack, and by the revolutions of the hand-wheel F moves the frame E laterally across the instrument.

Immediately in front of the frame E is placed the "ground-glass" frame G, (shown detached in Fig. 4,) which is connected with the frame E in the following manner: A pin $m$, projecting from each side of the frame G, passes through a hole in the frame E. Two springs $n$, attached to the frame G, bear against the frame E and tend to press the frame G toward the front of the frame A. Immediately in front of the frame G is placed the plate-holder H, which has a back $o$ hinged at 5, which will open to allow the plate I to be introduced into place, where it is held by the springs $p$ and a slide or shield J, which is to be withdrawn after the focus of the lens is adjusted. I may here remark that when the plate-holder H is removed the ground glass $q$ is thrown by the springs $n$ into the place of the plate I. To the back of the plate-holder H is attached a rack-bar $r$. A short shaft $s$, which carries a hand-wheel K and a pinion L, has its bearings in the top of the frame E. The pinion L engages with the rack $r$, so that by revolving the wheel K the plate-holder H is raised or lowered vertically, and in order to guide this motion of the plate-holder a tongue $n$ on each side of the front of the frame G slides in a groove $v$ in the back of the plate-holder. By the above arrangement of mechanism I am enabled to move the plate I quickly and accurately into any definite position to bring different portions of it successively into the field of the lens.

In order to assist the operator in defining the position of the plate with respect to the lens, I have made use of indices, either the marks 20 on the back face of the frame A, which fix the position of the corner $w$ of the plate-holder, or else circular plates $x$, secured on the shafts $y$ and $s$, the position of which is defined by a spring-pawl 8, which drops into notches in the plate $x$. If different-sized plates I are to be used and a different number of impressions are to be taken on the plate, a different scale 20 will be used or a different-sized plate $x$ on the shafts $y$ or $s$ will be used. The various scales 20 may occupy different corners of the frame A or the various-sized plates $x$ may be placed on the shafts $y$ and $s$, as at 9, Fig. 1.

Having now described the first and second parts of my invention, I will proceed to describe the mechanism by which the lens-tubes are adjusted. As before stated, it is customary where several impressions of the same object are to be taken at one time to use two or more lens-tubes. It is necessary that these lens-tubes be moved not only toward and from the ground glass or plate to adjust the focus and size of the picture; but also that these tubes should be moved toward and from each other to bring the picture opposite to the holes 15 in the diaphragm O, through which it is thrown onto the ground glass or the plate. To facilitate this latter movement, I use the following mechanical device. The lens-tubes $a\ b\ c\ d$, as before stated, are carried in the lens-box C, to the front of which is attached the brackets $a^2\ b^2$. A shaft $c^2$ has its bearings in the brackets $a^2$, and has cut on it at its opposite ends right and left hand screws 9 and 10, which pass through and engage with nuts $d^2$ on rods, which slide freely in sleeves or sockets $e^2$, attached to the tubes $a\ b\ c\ d$. In the same manner another shaft $f^2$ has its bearings in the brackets $b^2$, and its screws 11 and 12 engage with the nuts $h^2$ on rods which slide in the sockets $i^2$, attached to the lens-tubes. This allows the sockets $e^2$ to slide vertically on the rods to which the nuts $d^2$ are attached, and the sockets $i^2$ to slide horizontally on the rods to which the nuts $h^2$ are attached, so that as the shaft $c^2$ is revolved by the thumb-nut 13 the tubes $a\ d$ and $b\ c$ will approach toward or recede from each other. And in the same way as the shaft $f^2$ is revolved by the thumb-nut 14, the tubes $a\ b$ and $d\ c$ will approach or recede from each other. Thus by simply turning the thumb-nuts 13 and 14 I can quickly and accurately adjust the positions of the lens-tubes $a\ b\ c\ d$ with respect to the different portions of the diaphragm O and the plate I. A different diaphragm O will be used, with holes 15 of a different size and position, when different-sized impressions are to be taken. The inner ends of the tubes $a\ b\ c\ d$ are secured in blocks 16, which slide in the box C against the inside of the front of it.

What I claim as my invention, and desire to secure by Letters Patent, is—

1. A mechanism for moving the plate-holder H, in combination with an index for defining its position, operating substantially in the manner described.

2. The mechanical means herein described or its substantial equivalent for varying the positions of the lens-tubes $a\ b\ c\ d$.

SIMON WING.

Witnesses:
THOS. R. ROACH,
EDMUND MASSON.